US012212107B2

(12) United States Patent
Goutiere

(10) Patent No.: US 12,212,107 B2
(45) Date of Patent: Jan. 28, 2025

(54) FLAT CONNECTOR FOR SOLDERING ON LAMINATED GLASS

(71) Applicant: AGC GLASS EUROPE, Louvain-la-Neuve (BE)

(72) Inventor: Laurent Goutiere, Court-Saint-Etienne (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 195 days.

(21) Appl. No.: 17/999,684

(22) PCT Filed: May 28, 2021

(86) PCT No.: PCT/EP2021/064329
§ 371 (c)(1),
(2) Date: Nov. 22, 2022

(87) PCT Pub. No.: WO2021/239937
PCT Pub. Date: Dec. 2, 2021

(65) Prior Publication Data

US 2023/0291129 A1 Sep. 14, 2023

(30) Foreign Application Priority Data

May 29, 2020 (EP) .................................... 20177595

(51) Int. Cl.
*H01R 4/04* (2006.01)
*H01R 4/02* (2006.01)
(Continued)

(52) U.S. Cl.
CPC ............... *H01R 4/024* (2013.01); *H01R 4/04* (2013.01); *H01R 4/58* (2013.01); *H01R 4/70* (2013.01)

(58) Field of Classification Search
CPC . H01R 4/04; H01R 4/024; H01R 4/58; H01R 4/70
See application file for complete search history.

(56) References Cited

U.S. PATENT DOCUMENTS 4,023,008 A * 5/1977 Durussel ................. H05B 3/84 219/203
5,023,403 A 6/1991 Eckardt et al.
(Continued)

FOREIGN PATENT DOCUMENTS

DE 195 36 131 C1 1/1997
EP 1 439 600 A2 7/2004
(Continued)

OTHER PUBLICATIONS

International Search Report issued Sep. 2, 2021 in PCT/EP2021/064329 filed on May 28, 2021, 4 pages.

*Primary Examiner* — Sherman Ng
(74) *Attorney, Agent, or Firm* — Oblon, McClelland, Maier & Neustadt, L.L.P.

(57) ABSTRACT

A flat plate connector including a glass substrate, a conductive silver printing, an adhesion material for electrical connection, an insulated film, a conductive metal strip, and an additional adhesion tape. The flat connector having a dedicated cut-out, where the flat connector before mechanical and electrical bounding with the adhesion material can be fixed with a tape which, depending on its type, can also enhance pull-off resistance and ageing tests. The area is then defined as the surface where the connector adheres to the glass, including the different adhesion materials. The dedicated cut is made in the flat connector to generate a symmetric tensile stress on this adhesion area when the connector is submitted to a pull-off tensile force, the symmetry axis being defined by this pull force axis.

16 Claims, 4 Drawing Sheets

(51) Int. Cl.
*H01R 4/58* (2006.01)
*H01R 4/70* (2006.01)

(56) References Cited

U.S. PATENT DOCUMENTS

| | | | | |
|---|---|---|---|---|
| 5,867,128 | A | 2/1999 | Sauer | |
| 6,406,337 | B1 | 6/2002 | Machado | |
| 7,134,201 | B2 * | 11/2006 | Ackerman | H01R 43/0242 29/842 |
| 9,997,846 | B1 * | 6/2018 | Salter | H01R 4/04 |
| 2002/0111081 | A1 | 8/2002 | Machado | |
| 2003/0034169 | A1 | 2/2003 | Tanaka | |
| 2005/0009416 | A1 | 1/2005 | Tanaka | |
| 2010/0294566 | A1 * | 11/2010 | Reul | H05B 3/84 174/94 R |
| 2010/0319977 | A1 | 12/2010 | Rateiczak et al. | |
| 2013/0043066 | A1 * | 2/2013 | Cholewa | B23K 1/06 228/256 |
| 2015/0296569 | A1 * | 10/2015 | Rateiczak | H05B 3/84 219/541 |
| 2016/0240935 | A1 | 8/2016 | Katakura | |
| 2018/0138575 | A1 * | 5/2018 | Sarkis | H01Q 1/325 |
| 2020/0136283 | A1 * | 4/2020 | Webb | H01Q 1/1278 |

FOREIGN PATENT DOCUMENTS

| | | | |
|---|---|---|---|
| EP | 3 054 530 | A1 | 8/2016 |
| WO | WO 2017/064570 | A2 | 4/2017 |

* cited by examiner

FLAT CONNECTOR FOR SOLDERING ON LAMINATED GLASS

FIELD OF INVENTION

The present invention relates to a flexible electrical connector for connection to an electrical element on a substrate such as glazing in a vehicle. More specifically, the present invention relates to a flat connector for soldering on laminated and/or tempered glass.

BACKGROUND OF THE INVENTION

In the art there are many electrical connectors, which are used to connect (directly or indirectly) many different types of electrical elements to a source of electrical power. In the field of glazings, especially vehicle glazings, one such example of an electrical connector is described in EP 1439600 A2 which is suitable for connecting connection points (conducting tracks) comprised in a vehicle glazing to the battery of a vehicle into which the glazing may be fitted, so that electrical power may be provided to the connection points. The thickness of the insulating foil and the surface area of the opening is matched to the metal volume of a solder deposit providing the electrical connection between the contact surface and the terminal surface. However, it does not solve the problem of a flexible electrical connector for connection to an electrical element on a substrate, guaranteeing a good resistance to pulling force that can be applied to the connector during mounting of the glazing or the vehicle lifetime. To reach sufficient resistance level to pulling efforts, the connector design must prevent that pulling efforts applied on the connector generates a peeling effect of the connection area, having low resistance level, but rather generates a symmetric tensile stress on the adhesion area of the flexible electrical connector, having higher resistance level.

In another closest prior art, DE4304788A1 discloses a multilayer sheet contact having a metal foil strip which is used as an electrical conductor and is surrounded by a heat-resistant two-layer insulating jacket made of synthetic material. In the area of a welded connection, the sheet contact has a welding eyelet. For this purpose, both the metal foil strip and the two plastic covering sheets are provided with a cut, the cutting of the metal foil strip being smaller than that of the cover sheets. The foil strip is held at a defined distance from the surface of the support by the lower cover sheet applied to the support, the intermediate space being filled with molten solder which penetrates through the welding eye. This contact sheet cannot be equipped beforehand with a solder deposit. However, it does not solve the problem of a flexible electrical connector for connection to an electrical element on a substrate, generate a symmetric tensile stress on the adhesion area of the flexible electrical connector, and so insuring a good pull resistance of the connection.

The electrical connector of EP 1439600 is constructed from two insulating layers which lie adjacent and parallel to one another and which form the connector body. At one end of the body there is a connection zone where a plurality of metallic contacts, for example blobs of solder, are located. Each contact is electrically connected to an individual metallic conducting track; the conducting tracks extend between the insulating layers to the other end of the connector body to a hub for connection to a vehicle's power supply. However, it does not solve the problem of a flexible electrical connector for connection to an electrical element on a substrate, generate a symmetric tensile stress on the adhesion area of the flexible electrical connector, and so insuring a good pull resistance of the connection.

Furthermore, with current flexible connector, when the flexible connector is submitted to a pulling tensile force, an asymmetric tensile stress is applied on the adhesion area of the flexible connector, generating peeling of the conductive element provided on the glazing leading to detachment of the flexible connector. Indeed, the peeling stress leads to low adhesion strength, so low resistance to pull-off tensile force, which is required to secure the connection in time.

The problems mentioned in prior arts are overcome by the application of the present invention proposing a flat connector whose the pulling forces applied on the connector generates a symmetrically distributed stress on the adhesion area, in regards to the pulling axis. The peeling effect generated by other standard flat connectors is eliminated thanks to the symmetrical distribution of the stress on the adhesion area in regards to the pull force axis.

It is therefore an object of the present invention to provide a flat electrical connector suitable for connection to an electrical element on a substrate with high pulling resistance, which does not suffer from the problems outlined above during and after its connection to the electrical element.

Accordingly, the present invention provides a flexible electrical connector for connection to an electrical element on a substrate such as glazing in a vehicle. It is designed to allow to generate a symmetric tensile stress, in regards to the pull force axis, on the adhesion area of the flexible electrical connector to an electrical element on a substrate such as glazing when submitted to a pull-off tensile force.

SUMMARY OF THE INVENTION

The present invention relates to a flexible electrical connector for connection to an electrical element on a substrate such as glazing in a vehicle, the connector designed to allow to generate a symmetric tensile stress, in regards to the pull force axis, on the adhesion area of the flexible electrical connector to an electrical element on a substrate such as glazing when submitted to a pull-off tensile force In one of the preferred embodiment of the invention a flexible flat connector to be electrically connected to a conductive structure provided on a glass substrate is disclosed comprising a conductive metal strip and an adhesion material (conductive glue or solder alloy) to connect mechanically and electrically the connector to the conductive structure provided on the glass substrate glass, the surface of this mechanical and electrical contact between the connector and the glass substrate being called the adhesion area, the connector being provided with at least one dedicated cut-out in or around the region in the defined adhesion area.

The connector is provided with an insulating film at least covering the connector side to be turned towards the glass substrate.

According to the present invention, the flat connector is provided with at least one dedicated cut-out in or around the adhesion area.

According to the present invention, the dedicated cut-out is made on the flat connector to generate a symmetric tensile stress over adhesion area when submitted to a pull-off tensile force, the symmetry axis being defined in regards to this pull force axis.

The flexible flat connector according to the present invention is provided with at least a cut-out, wherein the at least one cut-out is configured to a manner that the stresses generated by a pull-off tensile stress on the adhesion area are distributed symmetrically, in regards to this pull force axis.

The axial symmetry is defined by an axis perpendicular to the length of the connector and dividing the adhesion area into symmetrical parts; and wherein an axis of the pulling tensile force is centered and perpendicular to adhesion area, so located on the this symmetry axis.

According to the invention, the adhesion area is an interface between the conductive silver printing and the adhesion material. The dedicated cut is made on the flat connector to provide the axis of pulling force and flat connector axis are aligned and perpendicular, generating a symmetric tensile stress over adhesion area when submitted to a pull-off tensile force.

According to an embodiment of the present invention, the adhesion is performed with a connecting material as a solder alloy, leaded or lead free, or a conductive glue. This electrical connection can be combined with an adhesive material positioned at least on the side to be turned towards the support, evenly surrounding the electrical connection area. The adhesive tape can be of different types from standard to structural bounding tape (SBT) with temperature or IR curing. The purpose of this tape can be to help in positioning the connector and/or to enhance the adhesion strength and/or to provide a sealing around the electrical connection depending on its type.

Wherein the flat connector before electrical connection, by soldering or conductive glue, can be fixed by another adhesion material to enhance the connection process and depending on the material, strengthen the adhesion. The adhesion area is an interface between the conductive silver printing and the adhesion materials, as defined above.

According to an embodiment of the present invention, the conductive metal strip is an alloy of copper and tin or any conductive metal like copper, silver, and the like or any pure or plated with other metal like tin, and silver. The conductive metal strip is preferably copper. The solder alloy may comprise alloys from high to low melting temperature including materials as tin, copper, lead, silver, indium, and bismuth.

In another preferred embodiment of the invention, wherein the electrical connection material is a solder alloy, the insulated film of the flat connector can be remove from the top surface of the soldering area. Then, the opening in the soldering area allow to enhance heat transfer during soldering.

According to the invention, the dedicated cut-out can be made in a U-shape on the flat connector and dedicated cut can also be made straight along the length of the flat connector thereby bending the flat connector in two halves, provided that the at least one cut-out is configured to a manner that the stresses generated by pull-off tensile stress on the connector are distributed uniformly with respect to axial symmetry of the adhesion area.

The present invention further embodies that a plurality of cuts-out can be made on the flat connector, wherein the flat connector is a double way connector.

Another embodiment of the invention states that the insulating material can coat the edges of the cut-out in order to maximize shear resistance of the flat connector around the cut.

The present invention further states that, when the flat connector is connected to the conductive structure provided on the surface of the glass substrate by a solder material as adhesion material, a soldering flux can be pre-applied dry on the alloy drop or applied before soldering. The soldering process can be achieved by resistance soldering, solder ion or during autoclave process. The shape and number of solder points over the conductive film varies as per requirement.

Another embodiment of the invention discloses a glazing comprising: at least one pane of glazing material; a conductive structure; optionally an adhesive to fix the electrical connector to the glass substrate; a flexible connector at least covered by an insulated film as disclosed above.

According to one embodiment of the present invention, the conductive structure is a metallic coating such as silver coating. The conductive structure are well-know from the skilled person.

BRIEF DESCRIPTION OF DRAWINGS

The embodiments herein will be better understood from the following detailed description with reference to the drawings, in which.

DETAILED DESCRIPTION OF THE INVENTION

The embodiments herein and the various features and advantageous details thereof are explained more fully with reference to the non-limiting embodiments that are illustrated in the following detailed description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims. The terms like can be, shall be, could be, and other related terms herein disclosed in the foregoing and later parts of the specification in any means do not limit or alter the scope of the present invention. The terms are provided just for the mere understanding of the main invention and its embodiments.

Figure 1:
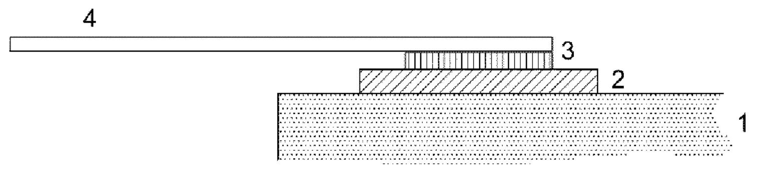
FIG. 1 is a side view of a standard flat connector without tensile pull-off stress applied.

FIG. 1 illustrates the side view of a standard flat connector (4) design used for electrical connection on glass. The standard flat connector (4) is connected to glass substrate (1) with the help of adhesion material (3). The adhesion material (3) is connected to standard flat connector (4) and conductive silver printing (2) with the help of conductive glue or soldering alloy or both in combination. The adhesion material (3) can also be connected with or without the use of tape. The tape can be of different types from standard to structural bounding tape (SBT) with temperature or IR curing. The conductive silver printing (2) can be with or without black underlay. The conductive silver printing (2) attached to surface is capable of being connected (electrically and adhesively) to a substrate.

Figure 2:
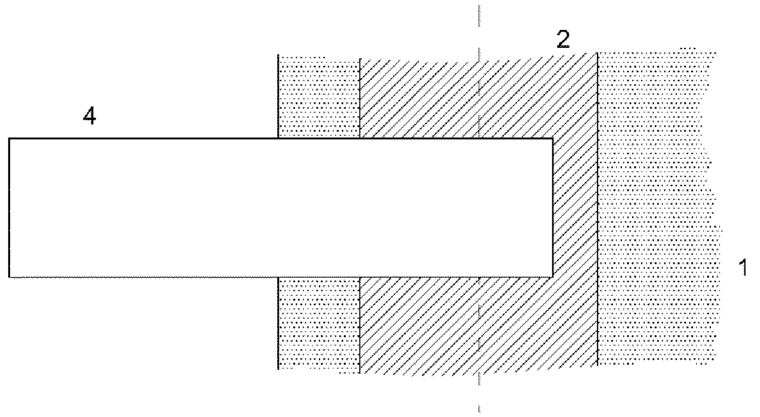
FIG. 2 is a top view of FIG. 1.

FIG. 2 illustrates the top view of standard flat connector (4). The top view show that the connector is perpendicular to the symmetrical axis of the adhesion area.

Figure 3:
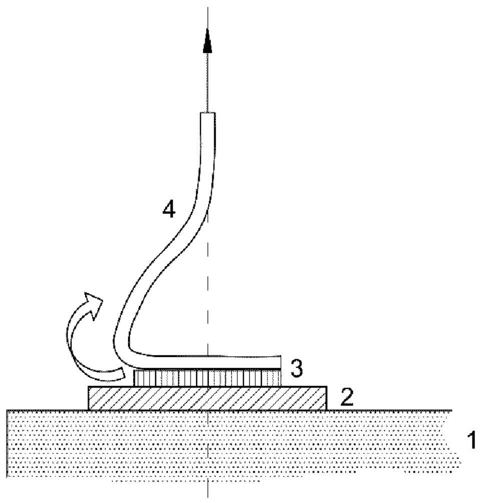
FIG. 3 is a side view of a standard flat connector when a pulling force is applied, the pulling axis is represented in dashed line, providing the symmetry axis on the adhesion are and considered in the according invention

FIG. 3 illustrates the side view when the standard flat connector (4) is pulled perpendicularly to the glass substrate. The pulling force which is also perpendicular to the flat connector (4) plane generates an asymmetric tensile stress on the adhesion material (3), in regards to the symmetry axis of the adhesion area aligned with the pull force axis (dashed line), resulting in a peeling stress on the adhesion material (3). The stress on the adhesion material (3) is not distributed uniformly over its entire surface. This resulting peeling stress leads to low adhesion force required to secure the connection in time. Any tensile test leads to a peeling of the connector instead of a pulling of the full connection surface.

Figure 4:
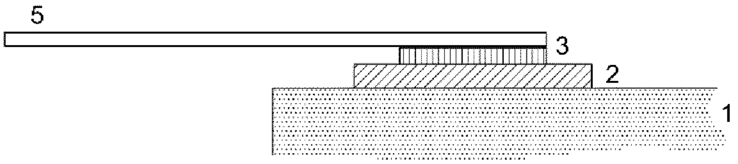
FIG. 4 is a side view of new flat connector design without pull-off tensile stress applied.

FIG. 4 illustrates the side view of a new flat connector (5) design used for electrical connection on glass. The new flat connector (5) is connected to glass substrate (1) with the help of adhesion material (3). The adhesion material (3) is connected to flat connector (5) according to the present invention and conductive silver coating with the help of conductive glue or soldering alloy or both in combination. The solder alloy is leaded or lead free or conductive glue and the conductive metal strip is any metal preferably copper. The adhesion material (3) can also be connected with or without the use of tape on insulating film. The tape can be of different types from standard to structural bounding tape (SBT) with temperature or IR curing. The conductive silver printing (2) can be with or without black underlay. The conductive silver printing (2) attached to surface is capable of being connected (electrically and adhesively) to a substrate.

Figure 5:
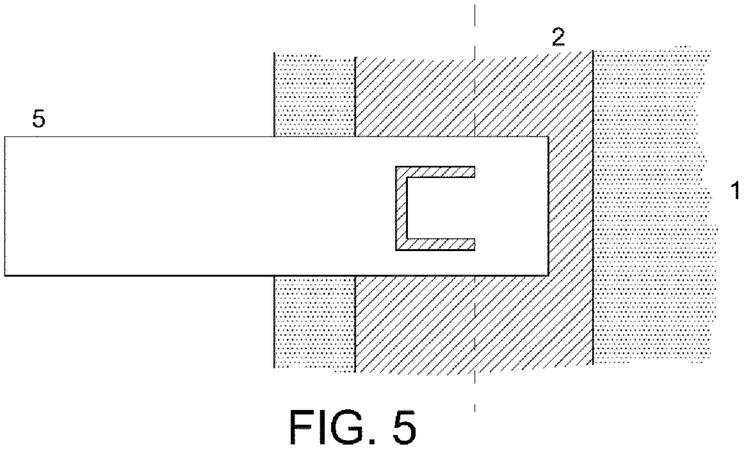
FIG. 5 is a top view of FIG. 4.

FIG. 5 illustrates the top view of a flat connector (5) according to the present invention which shows that the connector is perpendicular to the symmetrical axis of the adhesion area (5), according to the present invention. The flat connector (5) according to the present invention is cut with a certain shape in order to avoid peeling effect from one side of adhesion material (3). The shape of cut-out area is not restricted to U shape as shown in FIG. 5 but can be of any shape until it provides symmetrically distributed stresses on the adhesion area in regards to the defined symmetrical axis. The flat connector (5) according to the present invention can be insulated or not, partially or totally depending upon the requirement.

Figure 6:
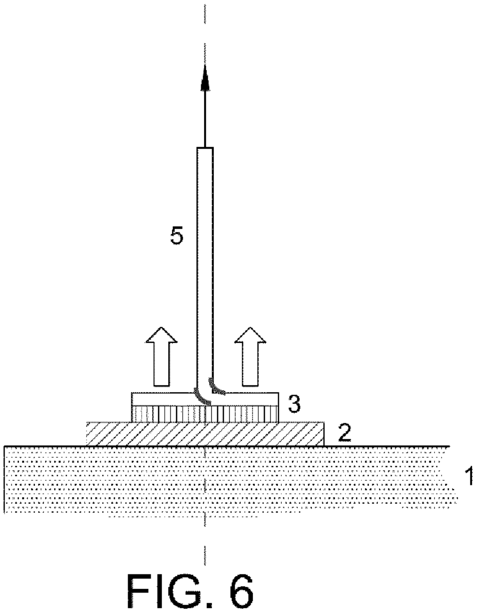
FIG. 6 is a side view of a new flat connector when a pulling force is applied, the pulling axis is represented in dashed line, providing the symmetry axis on the adhesion are and considered in the according invention

FIG. 6 illustrates the side view when the flat connector (5) according to the present invention is pulled perpendicularly to the glass plane. The pulling force which is also perpendicular to flat connector (5) plane generates tensile stresses which, due to the particular cut shape according to the present invention, are distributed symmetrically on the adhesion area as the pull-off axis is aligned with the symmetrical axis of the adhesion area (3). The stress generated on the adhesion material (3) is distributed uniformly along the entire surface of adhesion material (3). The symmetric pulling stress distribution lead to better adhesion strength to secure the connection in time. The new flat connector (5) eliminate the peeling stress on the adhesion material (3) leading to high resistance to pull-off tensile force.

Figure 7:
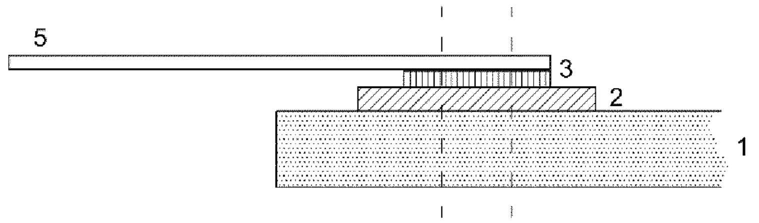
FIG. 7 is a side view of a new flat connector with cut-out A and cut-out B along symmetry axis during pulling force according to the invention.

FIG. 7 illustrates the side view of a flat connector (5) according to the present invention with cut-out design used for electric connection on glass. The flat connector (5) according to the present invention is connected to glass substrate (1) with the help of adhesion material (3). The adhesion material (3) is connected to flat connector (5) according to the present invention and conductive silver printing with the help of conductive glue or soldering alloy or both in combination. The solder alloy is leaded or lead free or conductive glue and the conductive metal strip is any metal preferably copper. The adhesion material (3) can also be connected with or without the use of tape on insulating film. The tape can be of different types from standard to structural bounding tape (SBT) with temperature or IR curing. The conductive silver printing (2) can be with or without black underlay. The conductive silver printing (2) attached to surface which is capable of being connected (electrically and adhesively) to a substrate.

Figure 8:
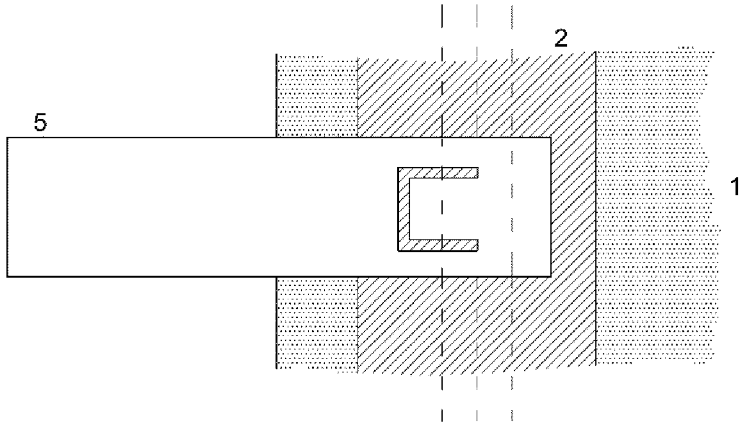
FIG. 8 is a top view of FIG. 7.

FIG. 8 illustrates the top view of flat connector (5) according to the present invention with cut-out design which shows that the connector is perpendicular to the symmetrical axis of the adhesion area (5) according to the present invention. The flat connector (5) according to the present invention is cut-out from dedicated area in order to have a tensile pull force centered on the soldered area to avoid peeling effect from one side of adhesion material (3). The shape of cut-out area is not restricted to U shape as shown in FIG. but can be of any shape until it provide the force along the symmetrical axis. The flat connector (5) according to the present invention can be insulated or not, partially or totally depend upon the requirement.

Figure 9:
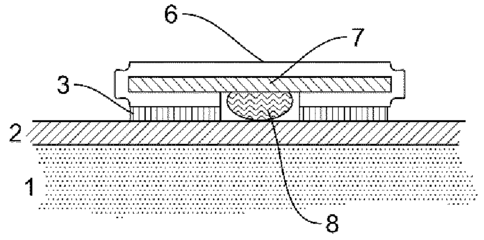
FIG. 9 is a cross section view of cut plane A of FIG. 7.
Figure 10:
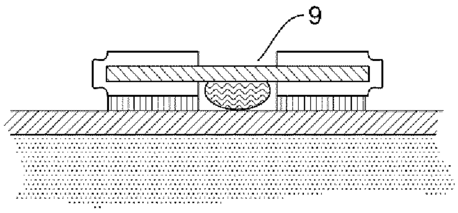
FIG. 10 is a cross section view of cut plane A FIG. 7, including here an opening in the top insulating film in order to ease the soldering process.
Figure 11:
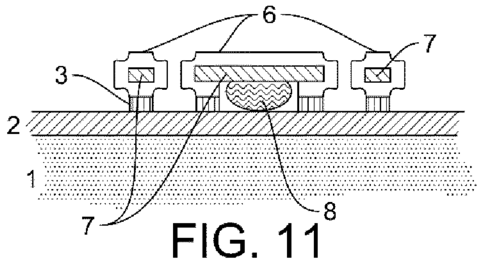
FIG. 11 is a cross section view of cut plane B of FIG. 7.
Figure 12:
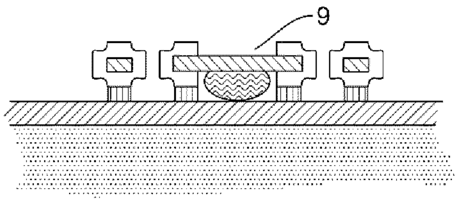
FIG. 12 is a cross section view of cut plane B of FIG. 7, including here an opening in the top insulating film in order to ease the soldering process.

FIG. 9 and FIG. 10 illustrates the cross section view along A cut plane. The conductive metal stripe (7) of flat connector (5) according to the present invention is soldered with solder alloy (8), where solder alloy can have lead or completely lead free or even a conductive glue can be used. The conductive metal stripe (7) can be coated with insulation film (6). In case of electric connection by soldering an opening (9) can be performed on the top of the insulation film to allow better heat transmission during the soldering process. A standard tape (3) can be used in addition to the adhesion material in order to help for the positioning before the adhesion by soldering or curing of conductive glue. This tape can also increase the adhesion strength in case of use of structural bounding tape (SBT) with temperature or IR curing FIG. 11 and FIG. 12 illustrates the cross section view along B cut plane. The conductive metal stripe (7) of flat connector (5) according to the present invention is soldered with solder alloy (8), where solder alloy can have lead or completely lead free or even a conductive glue can be used. The conductive metal stripe (7) can be coated with insulation film (6). In case of electric connection by soldering an opening (9) can be performed on the top of the insulation film to allow better heat transmission during the soldering process. The insulated film (6) connect conductive metal strip (7) to adhesion material (3) which further connected to conductive silver printing (2). The center part of Cut-out B can be attached to conductive silver printing (2) without using adhesion material (3) or the adhesion material (3) only on the center part of Cut-out B. This figures presents how the elements described in FIGS. 9 and 10 are arranged around the U-shape cut-out according to the present invention. In case of use of an insulation film (6), this one is preferably placed in a manner to protect the edges of the conductive metal stripe (7) around the U-shape cut-out. In that way, the shear resistance of this insulation material can increase the mechanical resistance of the connector around this cut-out.

Figure 13:
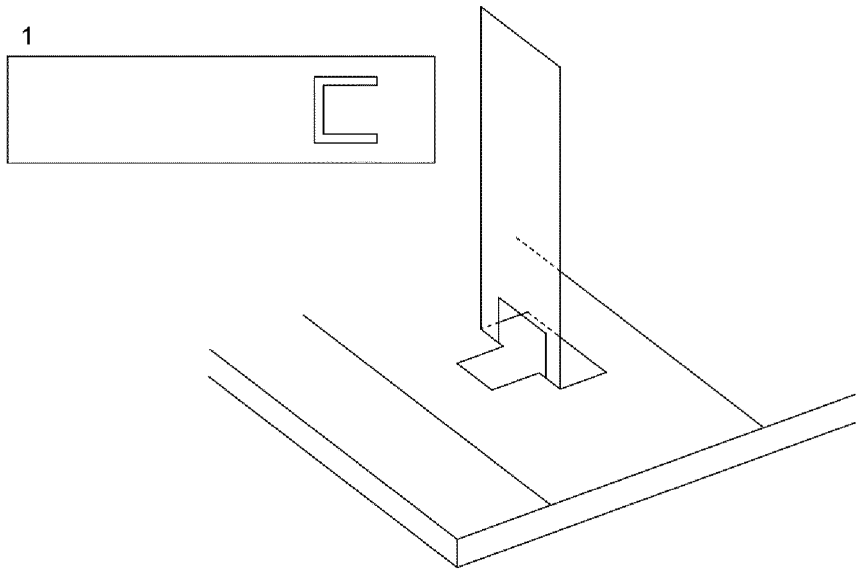
FIG. 13 is an oblique view of new flat connector design of FIG. 3.

FIG. 13 illustrates the axonometric view of the new flat connector (5) according to the present invention explained and presented on FIG. 4-12.

Figure 14:
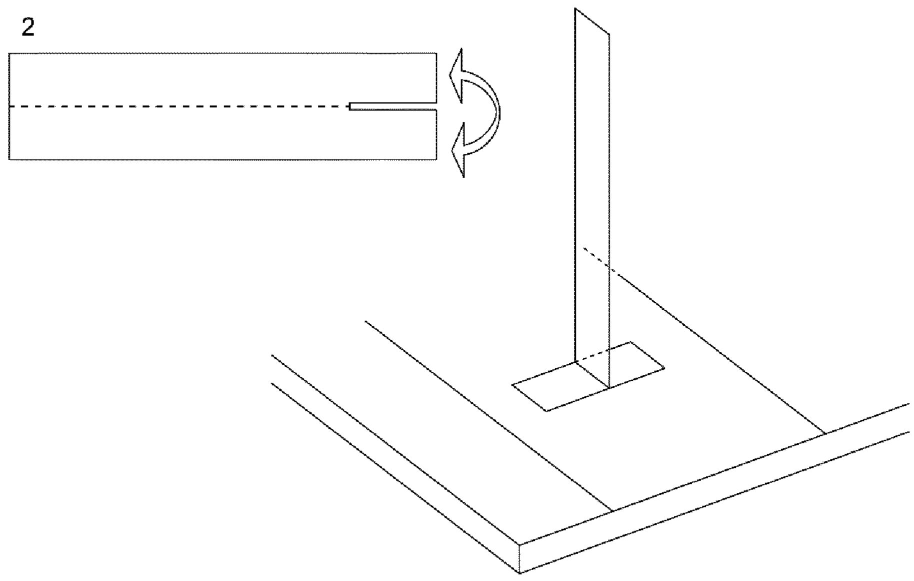
FIG. 14 is an oblique view of another connector design allowing to reach the same effect of stress distribution on the adhesion area, in this case, obtained by a straight shape cut-out with both end bend in opposite direction.

The FIG. 14 presents another connector design allowing the symmetrical distribution of the stresses on the adhesion area when submitted to pull-off tensile force. This is obtained by a straight shape cut-out at the end of a standard flat connector in the connection area, then a folding of the connector all along its longitudinal axis and finally a bending of the two connection parts in opposite direction. As explained by this example, the flat connector and cut-outs can be of any shape where the aim is to achieve uniform or symmetrical distribution of the tensile stresses on the connection area when the connector is submitted to a tensile pull-of force, in order to eliminate the peeling effects resulting in low resistance to such efforts.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms mentioned.

The invention claimed is:

1. A flexible flat connector to be electrically connected to a conductive structure provided on a glass substrate comprising:

a conductive metal strip, an adhesion material to connect the connector to the conductive structure provided on the glass substrate mechanically and electrically, a surface of a mechanical and electrical contact between the connector and the glass substrate called an adhesion area, an insulating film at least covering the connector on its side to be turned towards the glass substrate, wherein the flat connector is provided with at least one dedicated cut-out region in or around the adhesion area, and wherein the dedicated cut-out region is made on the flat connector to generate a symmetric tensile stress on the adhesion area when submitted to a pull-off tensile force, wherein a symmetry axis is defined in regards to a pull-off tensile force axis.

2. The flat plate connector according to claim 1, wherein the adhesion material is selected from the group consisting of lead, a lead free solder alloy, and a conductive glue.

3. The flat plate connector according to claim 1, wherein the conductive metal strip is an alloy of copper and tin or any conductive metal or any pure metal or plated with other metal.

4. The flat plate connector according to claim 1, further comprising a second adhesion material on at least a side turned towards a support, evenly surrounding an electrical connection area in order to help in positioning the connector, and/or to enhance an adhesion strength and/or to provide a sealing around the electrical connection.

5. The flat plate connector according to claim 4, wherein the dedicated cut-out can be performed in or around the second adhesion material.

6. The flat plate connector according to claim 1, wherein the insulating film is covering both sides of the connector.

7. The flat plate connector according to claim 6, wherein the insulating film also covers edges of the dedicated cut-out to maximize shear resistance of the flat connector around the cut.

8. The flat plate connector according to claim 6, wherein the adhesion material is a solder alloy and wherein the insulating film is removed on an other side of the solder area in order to help heat conduction during a soldering process.

9. The flat plate connector according to claim 1, wherein the dedicated cut-out has a U-shape.

10. The flat plate connector according to claim 1, wherein the dedicated cut-out is made straight along a length of the flat connector, before folding of the connector all along its longitudinal axis and finally bending two connection parts in opposite directions.

11. The flat plate connector according to claim 1, wherein multiple cut-outs are provided on the flat connector, and wherein the flat connector is a multiple way connector.

12. The flat plate connector according to claim 1, wherein the adhesion material comprises alloys from high to low melting temperatures, including tin, copper, lead, silver, indium, and bismuth.

13. The flat plate connector according to claim 1, wherein the adhesion material is a solder alloy and wherein a soldering flux is pre-applied dry on an alloy drop or applied before soldering.

14. The flat plate connector according to claim 13, wherein the soldering is selected from the group consisting of resistance soldering, solder iron, and an autoclave process.

15. A glazing comprising:

at least one pane of glazing material;

a conductive silvercoating structure; and a flat plate connector according to claim 1.

16. The flat plate connector according to claim 1, wherein the conductive metal strip is a conductive metal.

* * * * *